US008982496B1

(12) United States Patent
Maeto et al.

(10) Patent No.: US 8,982,496 B1
(45) Date of Patent: Mar. 17, 2015

(54) MAGNETIC DISK DEVICE AND READ CONTROL METHOD

(71) Applicant: Kabushiki Kaisha Toshiba, Minato-ku, Tokyo (JP)

(72) Inventors: Nobuhiro Maeto, Yokohama (JP); Kohsuke Harada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/340,154

(22) Filed: Jul. 24, 2014

(30) Foreign Application Priority Data

Apr. 7, 2014 (JP) ................. 2014-078638

(51) Int. Cl.
*G11B 15/12* (2006.01)
*G11B 19/02* (2006.01)
*G11B 15/10* (2006.01)
*G11B 5/02* (2006.01)

(52) U.S. Cl.
CPC . *G11B 19/02* (2013.01); *G11B 5/02* (2013.01); *G11B 15/10* (2013.01)
USPC .......................................................... 360/61

(58) Field of Classification Search
None
See application file for complete search history.

(56) References Cited

U.S. PATENT DOCUMENTS

| 6,967,810 | B2 | 11/2005 | Kasiraj et al. | |
| 7,679,851 | B1 * | 3/2010 | Sun et al. | 360/75 |
| 7,982,994 | B1 | 7/2011 | Erden et al. | |
| 2005/0068664 | A1 * | 3/2005 | Kasiraj et al. | 360/78.08 |
| 2007/0247738 | A1 * | 10/2007 | Yamagishi | 360/75 |
| 2008/0198501 | A1 * | 8/2008 | Kawabe | 360/77.06 |

FOREIGN PATENT DOCUMENTS

JP 07-176052 B2 7/1995

* cited by examiner

*Primary Examiner* — Thang Tran
(74) *Attorney, Agent, or Firm* — White & Case LLP

(57) ABSTRACT

According to one embodiment, switching takes place between a first control in which a first read head is assigned as a master head for reading data from a magnetic disk on which a sequential write direction is reversed at a switching position where a skew angle of a write head becomes 0 and between an outer periphery and an inner periphery in shingled write recording, and a second read head is assigned as a slave head for reducing inter-track interference during reading of the data and noise by virtue of an effect of waveform averaging with respect to the master head, and a second control in which the second read head is assigned as the master head and the first read head is assigned as the slave head.

20 Claims, 6 Drawing Sheets

FIG.2
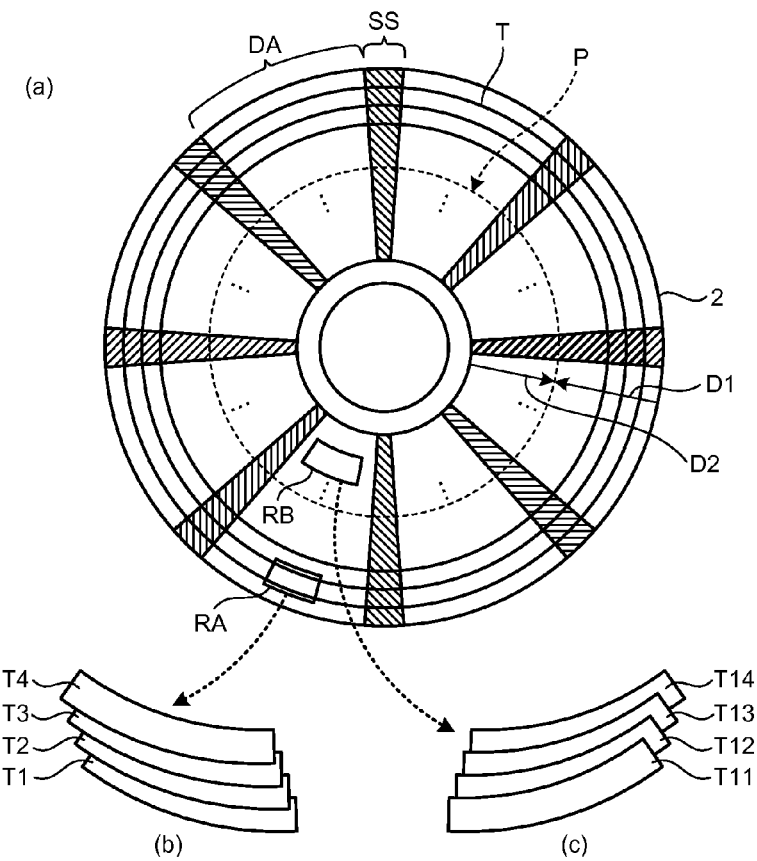
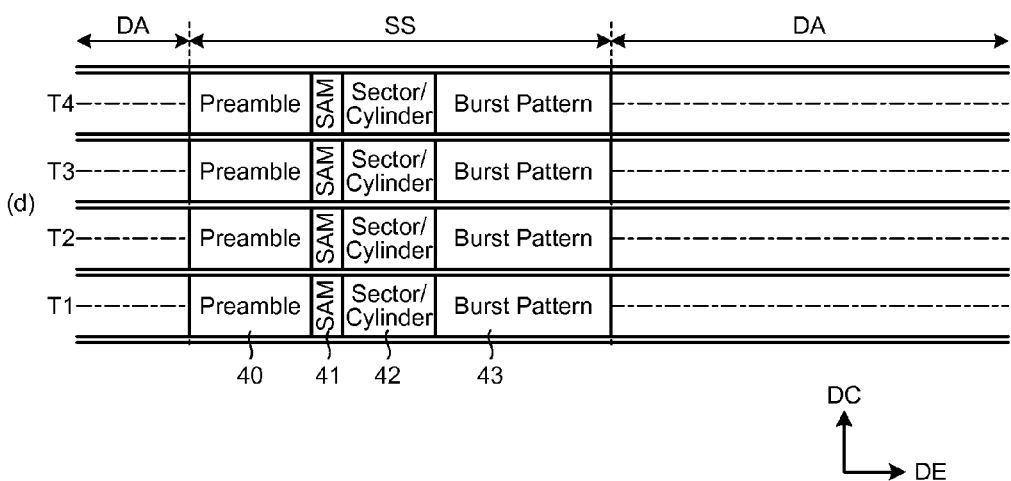

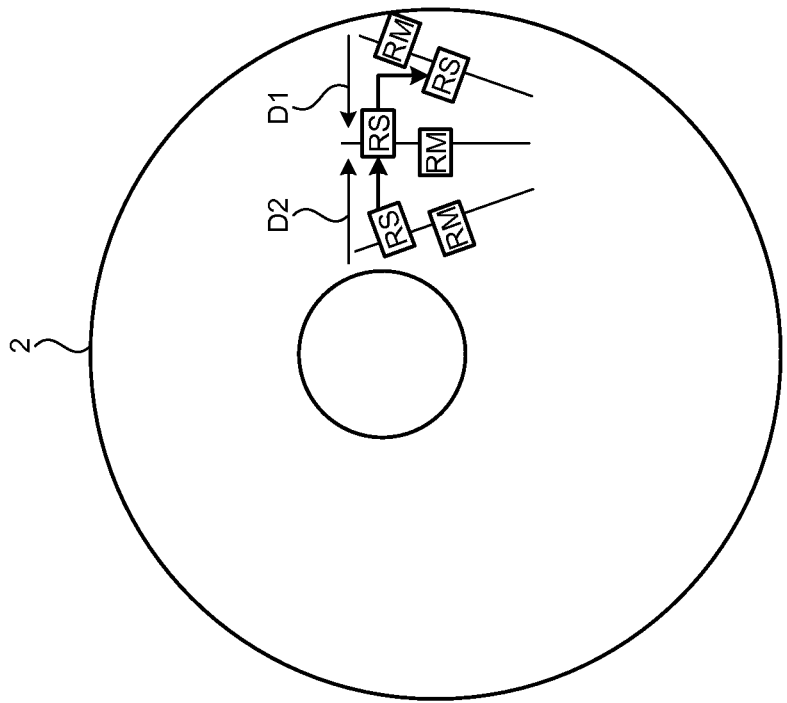
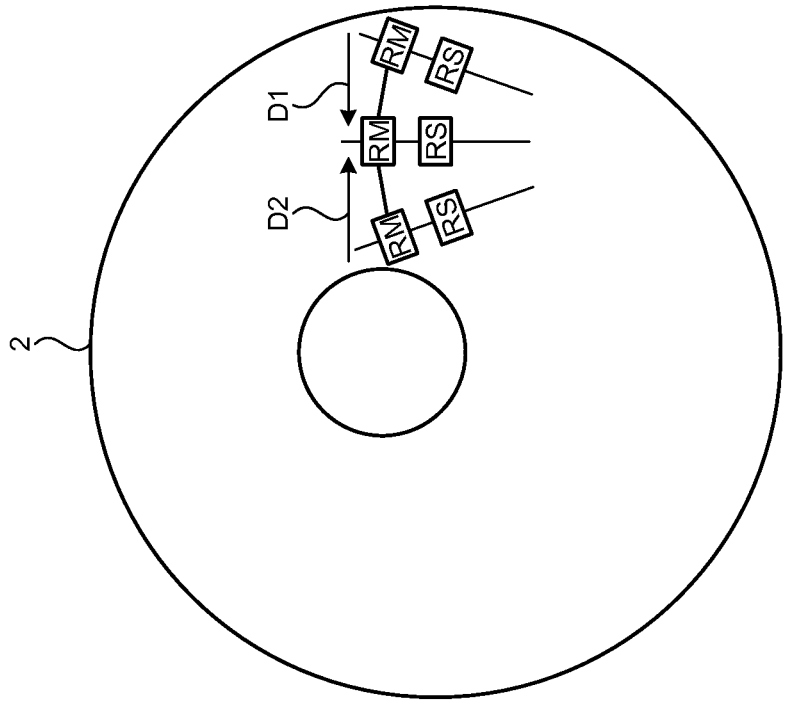

US 8,982,496 B1

MAGNETIC DISK DEVICE AND READ CONTROL METHOD

CROSS-REFERENCE TO RELATED APPLICATIONS

This application is based upon and claims the benefit of priority from Japanese Patent Application No. 2014-78638, filed on Apr. 7, 2014; the entire contents of which are incorporated herein by reference.

FIELD

Embodiments described herein relate generally to a magnetic disk device and a read control method.

BACKGROUND

There is a method for increasing a storage capacity in a magnetic disk device by which data is recorded on portions of adjacent tracks in overlapped state. This method may be called shingled write recording (shingled recording). Specifically, the singled write recording enables a track pitch to be narrower than a conventional one. As the track pitch becomes smaller, tracks adjacent to write tracks are prone to be subjected to magnetic influence from the write tracks. Thus, there has been suggested a multi-reader method to cancel signals read from the adjacent tracks.

BRIEF DESCRIPTION OF THE DRAWINGS

FIG. 2A is a plane view of a track arrangement in the magnetic disk illustrated in FIG. 1A, FIG. 2B is an enlarged plane view of a portion in region RA illustrated in FIG. 2A, FIG. 2C is an enlarged plane view of a portion in region RB illustrated in FIG. 2A, and FIG. 2D is a diagram illustrating a configuration example of a servo area illustrated in FIG. 2A;

FIG. 5A is a plane view illustrating a positional relationship between read heads when the read heads move in a cross-track direction according to a comparative example, and FIG. 5B is a plane view illustrating a positional relationship between read heads when the read heads move in the cross-track direction according to one embodiment;

DETAILED DESCRIPTION

According to one embodiment, switching takes place between a first control in which a first read head is assigned as a master head for reading data from a magnetic disk on which a sequential write direction is reversed at a switching position where a skew angle of a write head becomes 0 and between an outer periphery and an inner periphery in shingled write recording, and a second read head is assigned as a slave head for reducing inter-track interference during reading of the data and noise by virtue of an effect of waveform averaging with respect to the master head, and a second control in which the second read head is assigned as the master head and the first read head is assigned as the slave head.

Exemplary embodiments of a magnetic disk device will be explained below in detail with reference to the accompanying drawings. The present invention is not limited to the following embodiments.

Figure 1A:
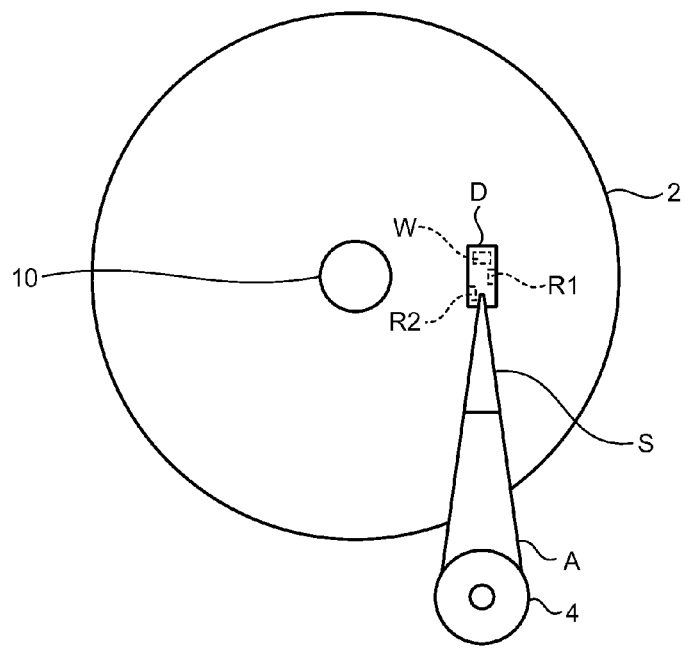
FIG. 1A is a schematic plane view of a carriage that is applied to a magnetic disk device according to one embodiment.
Figure 1B:
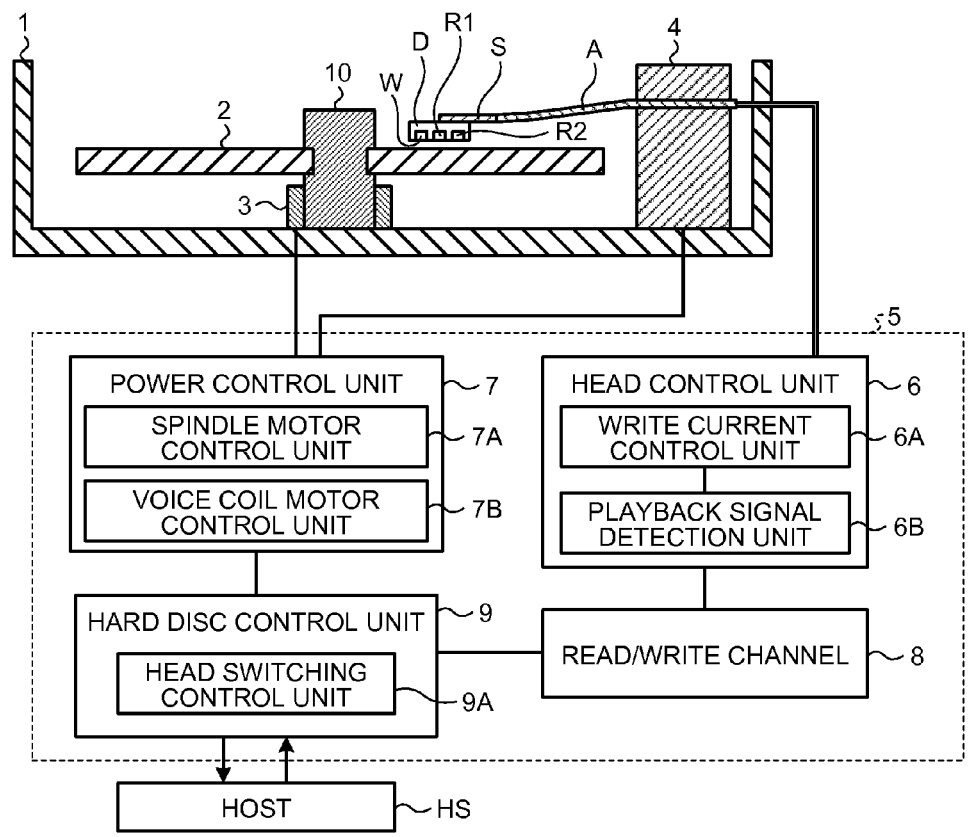
FIG. 1B is a schematic block diagram of the magnetic disk device according to one embodiment.

FIG. 1A is a schematic plane view of a carriage that is applied to a magnetic disk device according to one embodiment, FIG. 1B is a schematic block diagram of the magnetic disk device according to one embodiment, FIG. 2A is a plane view of a track arrangement in the magnetic disk illustrated in FIG. 1A, FIG. 2B is an enlarged plane view of a portion in region RA illustrated in FIG. 2A, FIG. 2C is an enlarged plane view of a portion in region RB illustrated in FIG. 2A, and FIG. 2D is a diagram illustrating a configuration example of a servo area illustrated in FIG. 2A.

Referring to FIG. 1, the magnetic disk device is provided with a magnetic disk 2 which is supported via a spindle 10. In the magnetic disk 2, a write direction is reversed along a cross-track direction at a predetermined switching position between an outer periphery and an inner periphery in shingled write recording. The magnetic disk device 2 is also provided with a write head W and read heads R1 and R2. The read heads R1 and R2 can be used as a master head for reading data or a slave head for reducing inter-track interference (ITI) during reading of data. The master head and the slave head make it possible to obtain an effect of waveform averaging to reduce random noise by using an average value of each bit sample obtained from two waveforms. The write head W and the read heads R1 and R2 are arranged so as to be opposed to the magnetic disk 2. Here, the write head W and the read heads R1 and R2 are held at a slider D. The slider D is held at an arm A via a suspension S. The slider D can lift the write head W and the read heads R1 and R2 above the magnetic disk 2. The suspension S can stabilize the amount of lifting of the slider D. The arm A can slide the slider D in a horizontal plane.

As illustrated in FIGS. 2A and 2D, the magnetic disk 2 is provided with tracks T along a down-track direction DE. The tracks T are provided with data areas DA into which user data is written and servo areas SS into which servo data is to be written. The servo areas SS are arranged radially in a cross-track direction DC, and the data areas DA are arranged between the servo areas SS. Written into the servo areas SS are preambles 40, servo area marks 41, sector/cylinder information 42, and burst patterns 43, as illustrated in FIG. 2D. The sector/cylinder information 42 can give servo addresses of the magnetic disk 2 in a circumferential direction and a radial direction, and can be used for seek control to move the write head W and the read heads R1 and R2 to target tracks. The burst patterns 43 can be used for track control to position the write head W and the read heads R1 and R2 within target tracks. The burst patterns 43 may be null-type patterns or area-type patterns, or phase-difference-type patterns. These servo data may be recorded in the magnetic disk 2 by self servo write or may be recorded in the magnetic disk 2 using a dedicated servo writer.

Shingled write recording is performed on the magnetic disk 2. At that time, the sequential write direction is reversed at a switching position P where a skew angle of the write head becomes 0 between the outer periphery and the inner periphery. Specifically, on the outer peripheral side of the switching position P, a write direction D1 is set from the outer to the inner periphery, and on the inner peripheral side of the switching position P, a write direction D2 is set from the inner to the outer periphery. As illustrated in FIG. 2B, at the tracks T1 to T4 on the outer peripheral side, some portions of the tracks on the outer peripheral side are overwritten by adjacent tracks on the inner peripheral side. In addition, as illustrated in FIG. 2C, at the tracks T11 to T14 on the inner peripheral side, some portions of the tracks on the inner peripheral side are overwritten by adjacent tracks on the outer peripheral side. The switching position P can be provided on an intermediate periphery between the outer periphery and the inner periphery.

Returning to FIG. 1, the magnetic disk device is provided with a voice coil motor 4 that drives the arm A, and a spindle motor 3 that rotates the magnetic disk 2 via the spindle 10. The magnetic disk 2, the slider D, the suspension S, the arm A, the voice coil motor 4, the spindle motor 3, and the spindle 10 are stored in a case 1.

The magnetic disk device is also provided with a magnetic recording control unit 5, and the magnetic recording control unit 5 is provided with a head control unit 6, a power control unit 7, a read/write channel 8, and a hard disk control unit 9.

The head control unit 6 is provided with a write current control unit 6A and a playback signal detection unit 6B. The power control unit 7 is provided with a spindle motor control unit 7A and a voice coil motor control unit 7B. The hard disk control unit 9 is provided with a head switching control unit 9A.

The head control unit 6 can amplify or detect signals during recording or playback. The write current control unit 6A can control write current flowing into the write head W. The playback signal detection unit 6B can detect signals read by the read heads R1 and R2.

The power control unit 7 can drive the voice coil motor 4 and the spindle motor 3. The spindle motor control unit 7A can control rotation of the spindle motor 3. The voice coil motor control unit 7B can control driving of the voice coil motor 4.

The read/write channel 8 can exchange data between the head control unit 6 and the hard disk control unit 9. Such data may be read data, write data, and servo data. For example, the read/write channel 8 can convert signals played back at the read heads R1 and R2 into a data format capable of being treated by the host HS, and convert data output from the host HS into a signal format capable of being recorded at the write head W. Such format conversions may DA conversion and encoding. The read/write channel 8 can also perform a decoding process on signals played back at the read heads R1 and R2, and perform code modulation on data output from the host HS.

The hard disk control unit 9 can perform recording/playback control according to an instruction from the outside and exchange data between the outside and the read/write channel 8. The hard disk control unit 9 may have a general-purpose processor to perform recording/playback control and a dedicated processor to exchange data between the host HS and the read/write channel 8. The head switching control unit 9A can switch between a control in which the read head R1 is assigned as a master head and the read head R2 is assigned as a slave head, and a control in which the read head R2 is assigned as a master head and the read head R1 is assigned as a slave head. The read/write channel 8 can switch between a setting for delaying a signal read by the master head and a setting for delaying a signal read by the slave head, according to the switching between the master head and the slave head.

The magnetic recording control unit 5 is connected to the host HS. The host HS may be a personal computer that issues a write command or a read command to the magnetic disk device or may be an external interface.

While the magnetic disk 2 is rotated via the spindle 10, signals are read from the magnetic disk 2 via the read heads R1 and R2, and the read signals are detected by the playback signal detection unit 6B. The signals detected by the playback signal detection unit 6B are subjected to data conversion at the read/write channel 8, and then are sent to the hard disk control unit 9. At the hard disk control unit 9, tracking control is performed on the read heads R1 and R2 based on servo data contained in the signals detected by the playback signal detection unit 6B. In addition, at the read/write channel 8, the read heads R1 and R2 are used as a master head and a slave head, thereby to reduce or cancel inter-track interference during reading of the data and noise by virtue of the effect of waveform averaging with respect to the master head.

Figure 3:
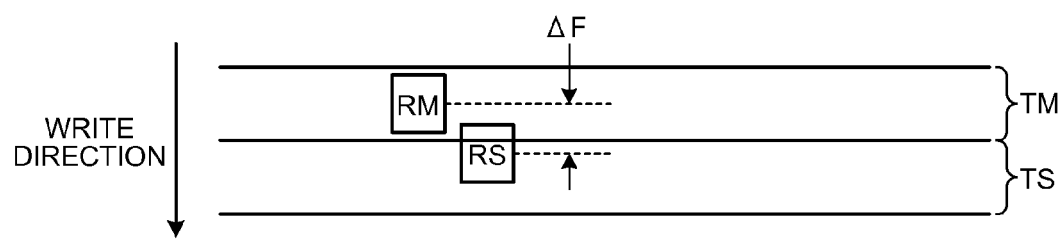
FIG. 3 is a plane view illustrating a tracking method of read heads illustrated in FIG. 1A.
Figure 4:
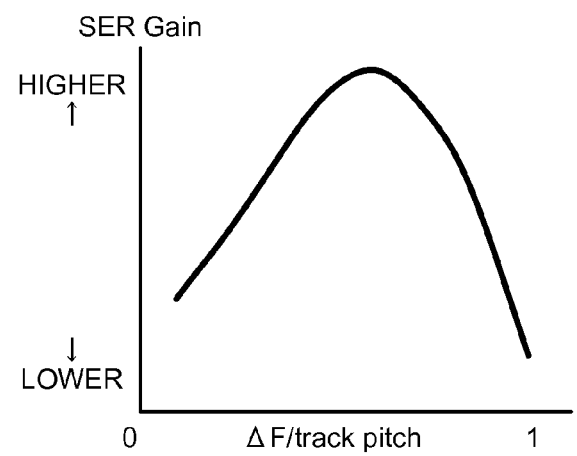
FIG. 4 is a diagram illustrating a relationship between values obtained by normalizing an offset between the read heads illustrated in FIG. 1A by a track pitch and sector error rate gains.

FIG. 3 is a plane view illustrating a tracking method of read heads illustrated in FIG. 1A, and FIG. 4 is a diagram illustrating a relationship between values obtained by normalizing an offset between the read heads illustrated in FIG. 1A by a track pitch and sector error rate gains.

Referring to FIG. 3, the master head RM scans a target track TM from which data is to be read. The slave head RS scans an adjacent track TS adjacent to the target track TM while partially overlapping the target track TM. Here, by optimizing an offset ΔF between the master head RM and the slave head RS, it is possible to effectively reduce or cancel inter-track interference during reading of the data and noise by virtue of the effect of waveform averaging with respect to the master head, and it is thus possible to increase a sector error rate gain (hereinafter, also referred to as SER gain) as illustrated in FIG. 4. The offset ΔF refers to a distance between the centers of the master head RM and the slave head RS in the cross-track direction DC. The SER refers to read error performance that is defined by the number of read error sectors/total number of read sectors.

FIG. 5A is a plane view illustrating a positional relationship between read heads when the read heads move in the cross-track direction according to a comparative example, and FIG. 5B is a plane view illustrating a positional relationship between read heads when the read heads move in the cross-track direction according to one embodiment.

Referring to FIG. 5A, the master head RM and the slave head RS are positioned in one and the same straight line extending from the center of rotation of the voice coil motor 4 to the center of the slider D. In addition, no switching takes place between the master head RM and the slave head RS. In this case, if the offset ΔF is not set to 0 at a boundary between the write directions D1 and D2, the positional relationship between the master head RM and the slave head RS does not meet the relationship in a direction of inter-track interference cancel read. Thus, the SER gain decreases in the intermediate circumference of the magnetic disk 2. At the outer peripheral side and the inner peripheral side of the magnetic disk 2, the SER gain can be obtained only in correspondence with the non-optimal offset ΔF due to a skew.

Meanwhile, referring to FIG. 5B, the master head RM and the slave head RS are arranged with a shift from one and the same straight line extending from the center of rotation of the voice coil motor 4 to the center of the slider D. In addition, switching takes place between the master head RM and the slave head RS at the boundary between the write directions D1 and D2. In this case, there is no need to set the offset ΔF to 0 at the boundary between the write directions D1 and D2 while the positional relationship between the master head RM and the slave head RS meets the relationship in the direction of the inter-track interference cancel read, and it is possible to optimize the offset ΔF on the outer peripheral side of the magnetic disk 2. This makes it possible to increase the SER gain on the outer peripheral side of the magnetic disk 2 and improve the storage capacity.

If switching takes place between the master head RM and the slave head RS, the read/write channel 8 can switch between the amount of delay of a signal read by the master head RM and the amount of delay of a signal read by the slave head RS.

Figure 6:
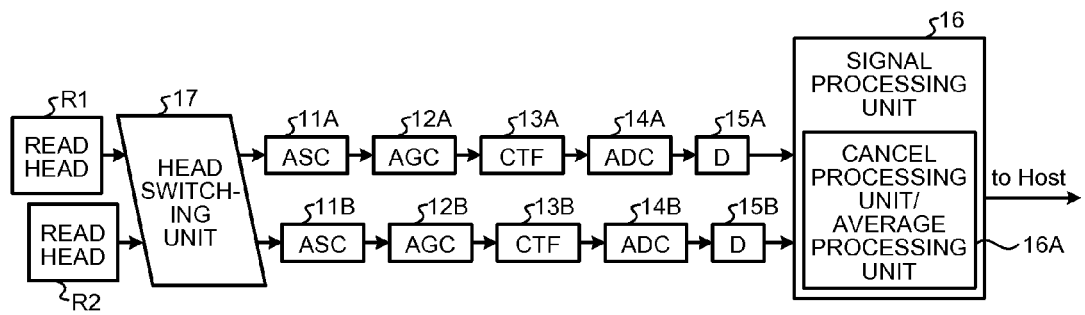
FIG. 6 is a schematic block diagram of a read/write channel illustrated in FIG. 1B.

FIG. 6 is a schematic block diagram of the read/write channel illustrated in FIG. 1B.

Referring to FIG. 6, the read/write channel 8 is provided with vertical asymmetric correction units 11A and 11B, automatic gain adjustment units 12A and 12B, continuous-time filters 13A and 13B, AD converters 14A and 14B, delay elements 15A and 15B, a signal processing unit 16, and a head switching unit 17. The signal processing unit 16 is provided with a cancel processing unit/average processing unit 16A that cancels inter-track interference during reading of data. The continuous-time filters 13A and 13B can use a low-pass filter that reduces radio frequency noise. The amounts of delays of the delay elements 15A and 15B can be set such that a time difference between the master head RM and the slave head RS during inter-track interference cancel read can be eliminated. The head switching unit 17 can switch between the state where, when the read heads R1 and R2 are the master head RM and the slave head RS, respectively, the read heads R1 and R2 are connected to the vertical asymmetric correction units 11A and 11B, respectively, and the state where, when the read heads R1 and R2 are the slave head RS and the master head RM, respectively, the read heads R1 and R2 are connected to the vertical asymmetric correction units 11B and 11A, respectively.

Then, if the read heads R1 and R2 are the master head RM and the slave head RS, respectively, a signal read by the read head R1 is transmitted to the signal processing unit 16 via the route from the vertical asymmetric correction unit 11A, the automatic gain adjustment unit 12A, the continuous-time filter 13A, the AD converter 14A, and the delay element 15A, and a signal read by the read head R2 is transmitted to the signal processing unit 16 via the route from the vertical asymmetric correction unit 11B, the automatic gain adjustment unit 12B, the continuous-time filter 13B, the AD converter 14B, and the delay element 15B.

Meanwhile, if the read heads R1 and R2 are the slave head RS and the master head RM, respectively, a signal read by the read head R1 is transmitted to the signal processing unit 16 via the route from the vertical asymmetric correction unit 11B, the automatic gain adjustment unit 12B, the continuous-time filter 13B, the AD converter 14B, the delay element 15B, and a signal read by the read head R2 is transmitted to the signal processing unit 16 via the route from the vertical asymmetric correction unit 11A, the automatic gain adjustment unit 12A, the continuous-time filter 13A, the AD converter 14A, and the delay element 15A.

Then, when the signals read by the read heads R1 and R2 are transmitted to the signal processing unit 16, the cancel processing unit/average processing unit 16A acquires a signal corresponding to data recorded in the target track TM, based on the signal read by the master head RM and the signal read by the slave head RS. Specifically, the data read by the slave head RS from the adjacent track TS is subtracted from the signal read by the master head RM, thereby to acquire the signal for the data read by the master head RM from the target track TM. In addition, waveforms of the signal read by the slave head RS from the target track TM and the signal read by the master head RM from the target track TM are averaged, thereby to acquire the signal for the target track TM with random noise reduced.

Figure 7:
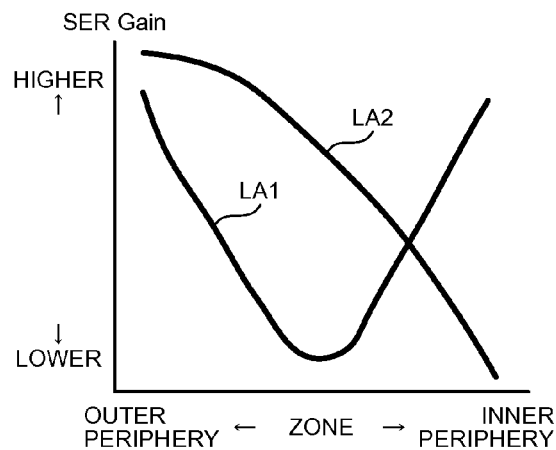
FIG. 7 is a diagram illustrating a comparison of a relationship between zones and sector error rate gains according to one embodiment with that in the comparative example.

FIG. 7 is a diagram illustrating a comparison of a relationship between zones and sector error rate gains according to one embodiment with that in the comparative example. In the drawing, LA1 refers to a comparative example illustrating the relationship using the configuration in FIG. 5A, and LA2 refers to an embodiment illustrating the relationship using the configuration in FIG. 5B.

In LA1 (comparative example), the offset ΔF is set to 0 at the boundary between the write directions D1 and D2. Thus, the SER gain decreases at the intermediate periphery of the magnetic disk 2. At the outer peripheral side and the inner peripheral side of the magnetic disk 2, the SER gain can be obtained only in correspondence with the non-optimal offset ΔF due to a skew.

Meanwhile, in LA2 (embodiment), by optimizing the offset ΔF at the outer peripheral side of the magnetic disk 2, it is possible to improve the SER gain at the outer peripheral side of the magnetic disk 2 as compared to the case of LA1. In addition, the offset ΔF can be set such that the SER gain has a line form from the outer peripheral side to the inner peripheral side of the magnetic disk 2. This makes it possible to improve the SER gain at the intermediate periphery of the magnetic disk 2 as compared to the case of LA1.

Figure 8:
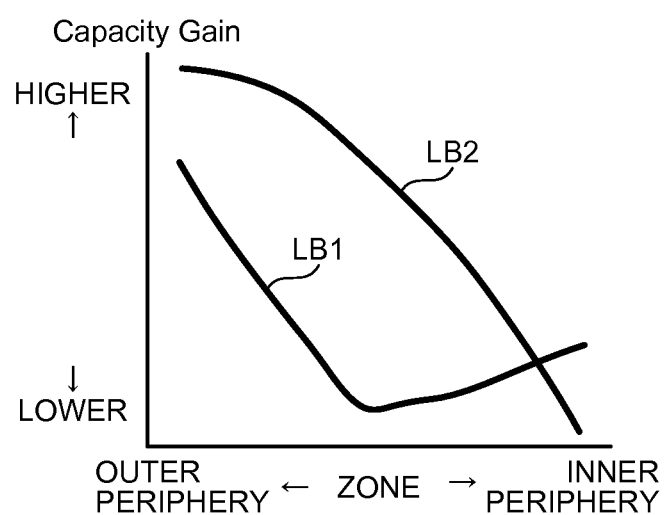
FIG. 8 is a diagram illustrating a comparison of a relationship between zones and capacity gains according to one embodiment with that in the comparative example.

FIG. 8 is a diagram illustrating a comparison of a relationship between zones and capacity gains according to one embodiment with that in the comparative example. In the drawing, LB1 refers to the case of using the configuration in FIG. 5A, and LB2 refers to the case of using the configuration in FIG. 5B.

Referring to FIG. 8, in the case of using the configuration of FIG. 5B, it is possible to improve the SER gain at the outer peripheral side with a large storage capacity as compared to the case of using the configuration of FIG. 5A, thereby improving capacity gain. In the case of using the configuration of FIG. 5B, the SER gain becomes smaller at the inner peripheral side of the magnetic disk 2 as compared to the case of using the configuration of FIG. 5A, but the magnetic disk 2 has a small storage capacity at the inner peripheral side, which makes it possible to keep the loss of the storage capacity to a minimum at the inner peripheral side of the magnetic disk 2. Accordingly, it is possible to obtain the effect of increasing the storage capacity in excess of the loss of the storage capacity at the inner peripheral side of the magnetic disk 2, and increase the storage capacity of the magnetic disk 2 as a whole. The storage capacity here refers to a value at which surface recording density defined by BPI (bit per inch)×TPI (track per inch) under the condition that a certain SER or less is attained becomes the highest. The capacity gain refers to a difference in storage capacity between the embodiment illustrated in FIG. 5B and the comparative example illustrated in FIG. 5A.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device, comprising:
   a magnetic disk on which a sequential write direction is reversed at a switching position where a skew angle of a write head becomes 0 and between an outer periphery and an inner periphery in shingled write recording;
   a first read head that reads data recorded on the magnetic disk;
   a second read head that reads data recorded on the magnetic disk; and
   a switching control unit that is configured to switch between a first control in which the first read head is assigned as a master head for reading data and the second read head is assigned as a slave head for reading data on a track adjacent to a track on which the data read by the master head is recorded, and a second control in which the second read head is assigned as the master head and the first read head is assigned as the slave head.

2. The magnetic disk device according to claim 1, wherein the slave head is used to reduce inter-track interference during reading of the data by the master head and noise by virtue of an effect of waveform averaging with respect to the master head.

3. The magnetic disk device according to claim 1, comprising:
   a cancel processing unit that cancels inter-track interference of a signal read by the master head according to a signal read by the slave head;
   a first delay unit that delays a signal read by the master head;
   a second delay unit that delays a signal read by the slave head; and
   a switching unit that switches between settings for the first delay unit and the second delay unit according to switching between the master head and the slave head.

4. The magnetic disk device according to claim 1, wherein an offset between the master head and the slave head is set such that an SER gain becomes the highest on an outer peripheral side of the magnetic disk.

5. The magnetic disk device according to claim 1, wherein the master head and the slave head are arranged with a shift from same straight line extending from center of rotation of a voice coil motor to center between the master head and the slave head.

6. The magnetic disk device according to claim 1, wherein switching takes place between the master head and the slave head at the switching position.

7. The magnetic disk device according to claim 1, wherein the first read head and the second read head are held at same slider.

8. The magnetic disk device according to claim 7, comprising a write head held at the slider.

9. The magnetic disk device according to claim 1, wherein on a track on the outer peripheral side of the switching position, a part of the track on the outer peripheral side is overwritten by an adjacent track on the inner peripheral side, and on the track on the inner peripheral side of the switching position, a part of the track on the inner peripheral side is overwritten by an adjacent track on the outer peripheral side.

10. The magnetic disk device according to claim 1, wherein on the outer peripheral side of the switching position, write direction is set from the outer periphery to the inner periphery, and on the inner peripheral side of the switching position, write direction is set from the inner periphery to the outer periphery.

11. A reading control method, comprising: switching between a first control in which a first read head is assigned as a master head for reading data from a magnetic disk on which a sequential write direction is reversed at a switching position where a skew angle of a write head becomes 0 and between an outer periphery and an inner periphery and a second read head is assigned as a slave head for reading data from a track adjacent to a track on which the data read by the master head is recorded, and a second control in which the second read head is assigned as the master head and the first read head is assigned as the slave head.

12. The reading control method according to claim 11, wherein the slave head is used to reduce inter-track interference during reading of the data by the master head and noise by virtue of an effect of waveform averaging with respect to the master head.

13. The reading control method according to claim 11, comprising:
    switching between a setting for delaying a signal read by the master head and a setting for delaying a signal read by the slave head according to switching between the master head and the slave head; and
    canceling inter-track interference of a signal read by the master head according to a signal read by the slave head.

14. The reading control method according to claim 11, wherein an offset between the master head and the slave head is set such that an SER gain becomes the highest on an outer peripheral side of the magnetic disk.

15. The reading control method according to claim 11, wherein the master head and the slave head are arranged with a shift from same straight line extending from center of rotation of a voice coil motor to center between the master head and the slave head.

16. The reading control method according to claim 11, wherein switching takes place between the master head and the slave head at the switching position.

17. The reading control method according to claim 11, wherein the first read head and the second read head are held at same slider.

18. The reading control method according to claim 17, comprising a write head held at the slider.

19. The reading control method according to claim 11, wherein on a track on the outer peripheral side of the switching position, a part of the track on the outer peripheral side is overwritten by an adjacent track on the inner peripheral side, and on the track on the inner peripheral side of the switching position, a part of the track on the inner peripheral side is overwritten by an adjacent track on the outer peripheral side.

20. The reading control method according to claim 11, wherein on the outer peripheral side of the switching position, a write direction is set from the outer periphery to the inner periphery, and on the inner peripheral side of the switching position, a write direction is set from the inner periphery to the outer periphery.

* * * * *